Figure 1:
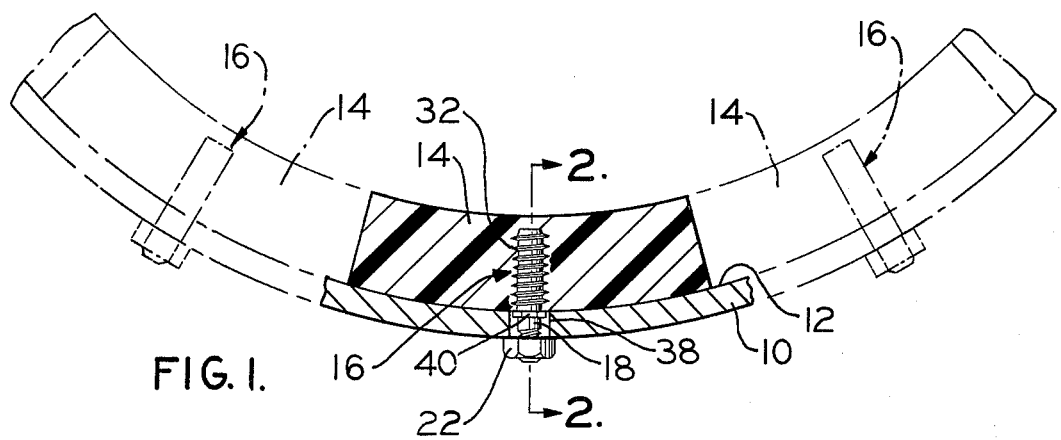

United States Patent [19]
Andersson

[11] 3,883,080
[45] May 13, 1975

[54] RETAINING ARRANGEMENT FOR RUBBER LINER

[75] Inventor: Sven E. Andersson, Chagrin Falls, Ohio

[73] Assignee: Trelleborg Rubber Company, Inc., Solon, Ohio

[22] Filed: Feb. 11, 1974

[21] Appl. No.: 440,995

[52] U.S. Cl. .......................... 241/182; 241/DIG. 30
[51] Int. Cl. .............................................. B02c 17/22
[58] Field of Search ............ 241/DIG. 30, 182, 183; 138/138, 147; 85/41, 1

[56] References Cited
UNITED STATES PATENTS

| | | | |
|---|---|---|---|
| 2,024,439 | 12/1935 | Evans | 241/182 |
| 2,110,948 | 3/1938 | Brandt | 85/41 UX |

Primary Examiner—Roy Lake
Assistant Examiner—E. F. Desmond
Attorney, Agent, or Firm—Meyer, Tilberry & Body

[57] ABSTRACT

A rubber wear-resistant liner and fastener combination is disclosed for attaching resilient, wear-resisting liner material to a device having a surface subject to wear. The arrangement includes a self-threading fastener component adapted to be rotatably embedded in the material of the lining either during or prior to attachment of the lining material to the surface to be protected.

11 Claims, 4 Drawing Figures

RETAINING ARRANGEMENT FOR RUBBER LINER

The present invention relates to the art of resilient wear-resistant linings and, more particularly, to an arrangement for releasably attaching lining material to a surface subject to wear.

Wear-resistant linings of resilient material such as natural or artificial rubber are commonly employed to protect surfaces which otherwise are exposed to wear during use. For example, rotary ball, tube or rod mills are provided with such linings to protect the inner surface of the rotatable shell or drum of the mill from abrasion by material being pulverized or mixed and from the effects of impact of the balls, tubes, rods or other grinding media placed in the drum during operation thereof. Further, such lining material is used to line the surfaces of chutes and the like along which abrasive material such as metal ore or other articles having an abrasive effect on the chute are conveyed by gravity.

In devices of the above character, as well as others wherein such lining material is desirable, it is essential that the lining material be secured to the supporting drum or chute in a manner whereby the surface of the lining exposed to the material being treated or conveyed is free of any exposed fastening components or portions of fastening components employed to achieve attachment of the liner to the support surface. In the past, the latter requirement has lead to the development of numerous fastener and liner arrangements which are structurally complex, expensive to manufacture and require considerable time and part manipulation to achieve mounting with respect to the support member therefor. In this respect, for example, rigid metal plate structures have been embedded in the lining material to provide T-slots or the like. Such T-slots receive and support headed fasteners such as bolts having a threaded shank which projects from the lining material and through a corresponding opening in the support member to receive a threaded nut by which the lining material is thus retained in place. Other arrangements heretofore provided have included the embedment of a metal plate in the lining material having threaded studs integral with and extending from the plate through the material and thence through openings in the support member to facilitate securement of the lining material to the support member through the use of threaded nuts.

It will be appreciated that the prior efforts such as those specifically referred to above not only require special fastener support arrangements within the material but require special manufacturing processes to arrive at a lining component or strip which is ready for attachment to the support surface. Accordingly, the cost of materials as well as the cost of production and installation are undesirably high. Moreover, such arrangements provide little if any capability with regard to interchangability of parts. In this respect, a lining component or strip designed for attachment to a given device generally will not be readily adaptable to use with a different device or a different device design. This inability to interchange lining components or to replace a damaged, worn or otherwise unusable lining component or section can lead to considerable down time of the device with which the lining is associated and a consequent loss in production.

In accordance with the present invention, a lining and fastener arrangement is provided which overcomes the disadvantages of previous arrangements including those enumerated hereinabove. In this respect, and in accordance with a broad aspect of the present invention, lining material in sheet or segment form is attached to a support member such as a drum wall or a chute wall by self-tapping threaded fasteners which are screwed into the lining material. The fastener may be in the form of a headed bolt having a shank passing through an opening in the support member, whereby screwing of the threaded end of the bolt into the lining material draws the latter into tight engagement with the support member. Alternatively, the threaded fastener may have a shank portion adapted to extend through the opening in the support member and receive a separate fastener component such as a nut which draws the lining material into tight engagement with the support member upon threading of the nut onto the shank. In an arrangement of the latter character, the threaded fastener is screwed into the lining material prior to positioning the liner with respect to the support member.

The liner and self-tapping threaded fastener combination of the present invention advantageously enables the production of lining material which is homogenous by the exclusion of fastener components or structural members defining a portion of a fastener assembly embedded in the lining material during the production thereof. Accordingly, the manufacturing process is simplified and the cost of production is minimized. Moreover, the time required and the cost of installation, removal and replacement of lining material relative to a support member therefor is minimized. In this respect, the lining material is positioned relative to the support member and the threaded fasteners are then screwed thereinto, or the appropriate locations for the fasteners are determined whereby preliminary screwing of the fasteners into the material assures proper location of the fastener shanks relative to openings therefor in the support member.

The ability to locate the fasteners relative to the lining in the foregoing manner advantageously avoids the possibility of misalignment which may occur between openings in the support member and pre-embedded fastener assemblies in the material resulting, for example, from variances in manufacturing tolerances. Still further, the exclusion of pre-embedded components of a fastener assembly in the lining material advantageously enables a sheet or block of lining material to be cut to a desired size and installed in existing equipment in place of or to repair a damaged portion of a liner. In this respect, all that is required to attach lining material to a support member in accordance with the present invention is an opening in the support member for the shank of the threaded fastener and which opening, if not existing, can readily be provided in the support member where desired. Thus, replacement and/or maintenance costs are considerably reduced.

In accordance with another aspect of the present invention, the self-tapping threaded fastener interengages with the lining material upon being screwed thereinto in a manner which maximizes retention of the fastener against withdrawal from the material. In this respect, the threaded fastener includes an axial bore adapted to receive a portion of the lining material therein when the fastener is screwed into the material. The bore provides the corresponding portion of the shank of the fastener with an annular wall, and the self-tapping threads extend about the outer surface of this wall. Accordingly, when the fastener is screwed into the lining material a portion of the material enters the bore, and the portion of the material surrounding the outer surface of the wall is expanded, whereby the annular wall is resiliently clamped radially between the two portions of the lining materials. This clamping relationship together with the radially outwardly extending disposition of the threads of the fastener restrain axial, non-rotative withdrawal of the fastener from the lining material.

An outstanding object of the present invention is the provision of a liner and fastener arrangement for attaching a lining of wear-resistant resilient material to a device having a surface subject to wear.

Another object is the provision of a liner and fastener arrangement of the foregoing character comprised of a minimum number of component parts which advantageously do not require any pre-assembly during manufacture of the parts.

A further object is the provision of a liner and fastener arrangement comprised of a liner of homogenous material and a self-tapping threaded fastener adapted to be screwed thereinto.

Still a further object is the provision of a liner and fastener arrangement which enables accurate location of the fastener component relative to the lining material prior to interengagement therebetween to assure proper alignment of the fastener and lining material with respect to the support member therefor.

Yet another object is the provision of a liner and fastener arrangement of the foregoing character by which the lining material can be positioned relative to the support member and the fastener thereafter screwed into the lining material to achieve fastener embedment and liner retention with respect to the support member.

Still another object is the provision of a liner and fastener arrangement for securing wear-resistant resilient lining material to a rotary mill drum, chute or the like and which lends to efficiency and accuracy in installation, economy in manufacture and maintenance, and versatility in use.

Figure 2:
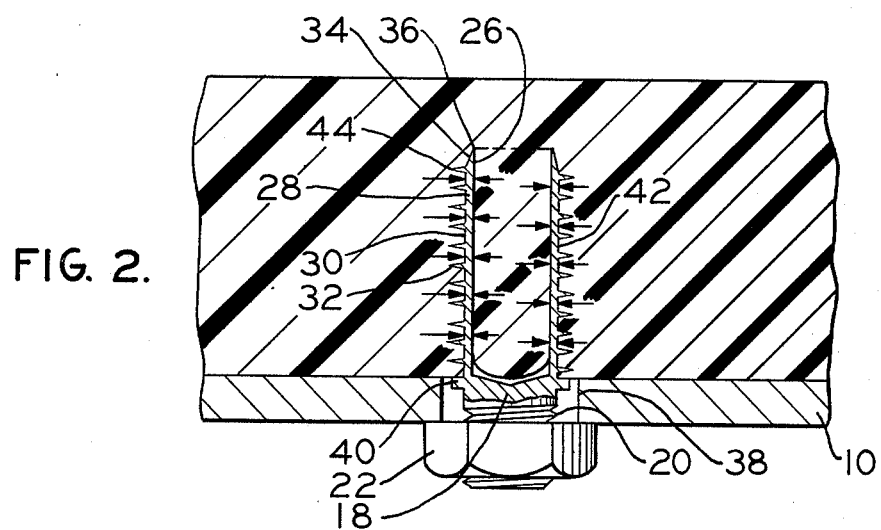
Figure 3:
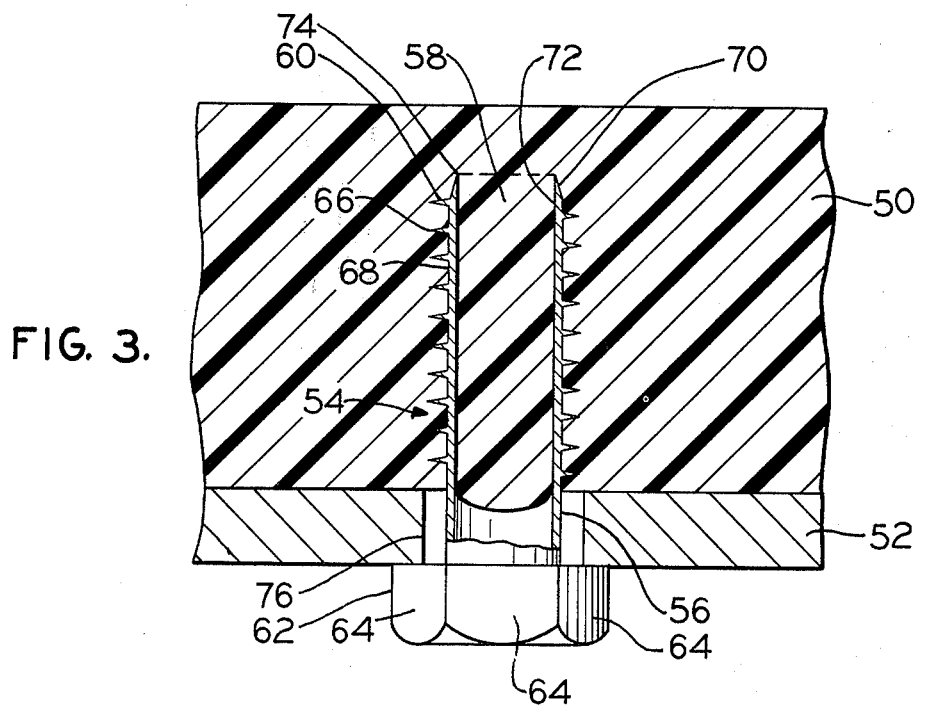
Figure 4:
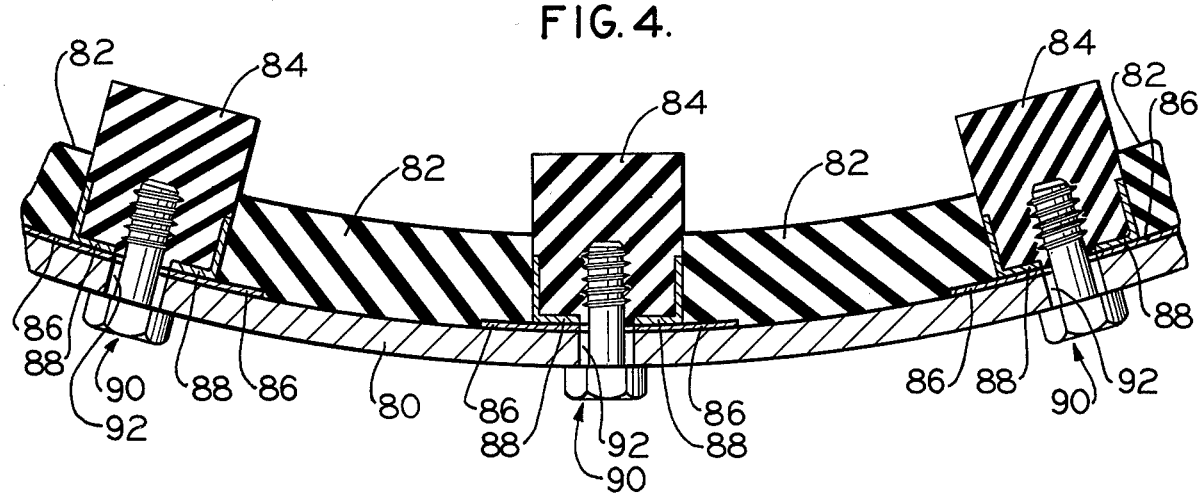

The foregoing objects, and others, will in part be obvious and in part pointed out more fully hereinafter in conjunction with the written description of preferred embodiments of the invention illustrated in the accompanying drawings in which:

FIG. 1 is an end elevation view, in section, of a liner and fastener arrangement for the shell of a rotary drum;

FIG. 2 is a detailed sectional elevation view of the arrangement of FIG. 1, the view being along line 2—2 in FIG. 1; and, FIG. 3 is a detailed sectional elevation view of another liner and fastener arrangement in accordance with the present invention, shown in conjunction with a chute wall; and FIG. 4 is an end elevation view of another liner and fastener arrangement for the shell of a rotary drum.

Referring now in greater detail to the drawings wherein the showings are for the purpose of illustrating preferred embodiments of the present invention only and not for the purpose of limiting the invention, a liner and fastener arrangement is illustrated in FIGS. 1 and 2 in associattion with a support member 10 such as the shell or drum of a rotatable ball, rod or tube mill. While member 10 is not shown in its entirety, it will be appreciated that the member is of cylindrical cross-sectional configuration and is adapted to be supported for rotation about the longitudinal axis thereof for materials introduced into the drum to be mixed and/or pulverized by such rotation together with the tumbling action of grinding media such as steel balls placed in the drum. Drum wall 10 has an inner surface 12 which is subject to wear by the abrasive and tumbling action of the material and grinding media therein and, accordingly, the inner surface is provided with a wear-resistant lining of resilient material such as natural or synthetic rubber. Such a lining is coextensive both circumferentially and longitudinally with respect to the inner surface of the drum and may be in the form of a single sheet, or in the form of a plurality of circumferentially adjacent segments.

In the embodiment illustrated in FIGS. 1 and 2, the liner is defined by a plurality of segments 14 each of which is attached to support member 10 by a corresponding self-tapping threaded fastener 16 to be described more fully hereinafter. While a single fastener is illustrated, it will be appreciated that two or more such fasteners may be associated with each segment 14 depending on the length thereof longitudinally of support member 10 and the width thereof circumferentially of the support member. If the segment of lining material is merely in the form of a circumferentially and longitudinally small plug such as might be used to repair a damaged area in an existing liner, a single fastener may well be sufficient to achieve adequate securement of the segment to the support member.

In the embodiment illustrated in FIGS. 1 and 2, self-tapping fastener 16 includes a shank portion 18 the outer end of which is of solid cross section and is provided with external threads 20 adapted to receive an internally threaded nut 22. The inner end of shank 18 is provided with a bore 24 which has an axial extent corresponding substantially to the depth of penetration of the fastener into liner segment 14. Bore 24 has a cylindrical inner surface 26 of uniform diameter throughout the axial extent thereof. Bore 24 provides the corresponding end of shank 18 with an annular wall 28 having an outer surface 30. A self-tapping thread flight 32 extends helically about outer surface 30 from a point adjacent the entrance to bore 24 to a location adjacent the end of the bore. Wall 28 is tapered inwardly at 34 adjacent the entrance to bore 24 and intersects with inner surface 26 of the bore to define an annular knife edge 36 which enhances penetration of the fastener into the lining material in response to rotation of the fastener relative thereto.

Fastener 16 is adapted to be screwed into lining segment 14 for the outer portion of shank 18 to project outwardly through a corresponding opening 38 in support member 10. In the present embodiment, fastener 16 is pre-assembled with respect to liner segment 14. More particularly, the liner segment is positioned relative to support member 10 and the desired location of the fastener relative thereto is suitably noted such as by marking, using opening 38 as a guide. Alternatively, the fastener can be inserted through the opening and screwed into the liner segment to initiate the embedding operation.

Shank 18 of fastener 16 is provided with a tool pad section 40 intermediate the opposite ends thereof and by which the fastener can be rotated by means of a wrench or the like to achieve embedment thereof in liner segment 14. In addition to providing a tool engaging surface, pad 40 further provides a convenient guide for determining the depth of penetration of the fastener into the liner segment. While preassembly of the liner and fastener is preferred, it will be appreciated that opening 38 may be of a diameter sufficient to permit the insertion of an appropriate socket wrench or the like over the outer portion of shank 18 so that the fastener can be fully screwed into the liner segment while the latter is retained in position with respect to support member 10.

As is best seen in FIG. 2, the threads of self-tapping screw flight 32 are axially narrow at the points of engagement thereof with outer surface 30 of wall 28. Further, the threads are axially spaced apart from one another to define axially flat surface portions 42 therebetween. The axially opposite sides of the threads intersect in a radially outer knife edge 44 which, together with annular knife edge 36, facilitates cutting penetration of the fastener into the lining material upon rotation of the fastener relative thereto. As fastener 16 is screwed into lining segment 14, a portion of the lining material is received in bore 24. Further, the axially thin threads of screw flight 32 cut into the lining material such that the portion of the lining material surrounding outer surface 30 of wall 28 is axially compressed between adjacent threads and is radially spread by wall portions 42 between the threads. Radial spreading or expanding of the material results primarily from the radial thickness of wall 28, and the radial spreading provides for wall 28 to be resiliently clamped radially between the inner and outer portions of the lining material, as designated by the opposed arrows in FIG. 2. This clamping action together with the lining material disposed between the axially adjacent threads of screw flight 32 enhances retention of the fastener against axial, non-rotative withdrawal of the fastener from the lining material. Thus, once the fastener is screwed into the lining segment, nut 22 can be threaded onto the outer end of shank 18 to draw the lining segment into tight engagement with the inner surfaces 12 of support member 10.

Rubber lining material of the character employed in connection with the present invention generally ranges in hardness from about 40° to 80° on the Shore A scale. Moreover, such linings vary in thickness from about ½ to 6 inches depending on the use of the device on which they are mounted. It will be appreciated therefore that the dimensions of the fastener, and particularly the dimensions of bore 24, wall 28 and the threads of screw flight 32 will vary depending on the thickness of the lining material, the hardness thereof, the number of fasteners required, and the design and dimensions of the self-tapping screw flight necessary to achieve the desired ease of penetration together with the desired retention capability. Preferably, for lining material of rubber having a thickness of about 2 inches and a Shore hardness of about 60°, a steel fastener is employed having an axially threaded shank portion of about 1½ inches and an outer diameter at the base of the threads of about ¾ inch. The bore in the shank preferably has a diameter of about 11/16 inch, whereby the bore wall has a radial thickness of about 1/64 inch. The self-tapping threads preferably have a radial extent from the outer surface of the shank of about 1/16 inch, and the base line between axially adjacent threads preferably has an axial length of about 1/16 inch. It will be appreciated, however, that other fastener dimensions and modifications of the above dimensions can be effectively employed with lining material of the hardness and thickness identified.

Another liner and fastener arrangement in accordance with the present invention is illustrated in FIG. 3 of the drawing. In this embodiment, lining material 50 which may be in the form of a sheet or segment as described hereinabove is shown as being attached to a planar support member 52 such as the wall of a chute. Attachment in the embodiment of FIG. 3 is achieved by means of a self-tapping threaded fastener 54 which is similar in many respects to fastener 16 described hereinabove in conjunction with the embodiment of FIGS. 1 and 2. In this respect, fastener 54 includes a shank portion 56 provided with an axial bore 58 and a self-tapping screw flight 60 extending helically about outer surface 62 of shank portion 56 from the entrance end of bore 58. In the present embodiment, the end of shank portion 56 opposite the entrance to bore 58 is provided with a head 62 which, in a well known manner, is provided with flats 64 about the periphery thereof for engagement with a wrench or the like to achieve rotation of the fastener.

Screw flight 60 is structurally similar to screw flight 32 described hereinabove in that the screw threads are axially thin at the base thereof and terminate at the radial outer ends thereof in knife edges 66. Moreover, axially adjacent threads of the screw flight are spaced apart by axially flat portions 68 of the outer surface of shank 56, and the entrance end of bore 58 is defined by a tapered wall 70 which intersects inner wall 72 of the bore to define an annular knife edge 74. The thread structure, as described hereinabove, enhances ease of penetration upon screwing the fastener into the liner and maximizes the retention of the fastener against axial, non-rotative displacement of the fastener relative to the liner.

The arrangement illustrated in FIG. 3 facilitates positioning a liner or liner segment relative to support member 52 and then securing the liner in place by screwing fastener 54 thereinto. In this respect, support member 52 is provided with an opening 76 for the shank of fastener 54 whereby, once liner 50 is properly positioned, connection is achieved by inserting the fastener through opening 76 and rotating the fastener by means of head 62 to achieve self-threading advancement of the fastener into the liner material. Head 62 engages the outer surface of support member 52 to draw liner 50 tightly against the inner surface of the support member. Penetration of the fastener shank into the lining material provides for the portions of the lining material inside the bore and surrounding the outer surface of shank 56 to resiliently clamp the annular wall of the fastener in the manner described hereinabove in conjunction with the preceding embodiment.

While the fastener structures described hereinabove facilitate screwing the fastener directly into the liner material, it will be appreciated that some form of guidance may be desired to assure that the fastener is at least properly directed into the material at the outset of the screwing operation. Such guidance may be achieved in any desired manner, and, for example, by the use of a sleeve or the like adapted to receive and axially guide rotation of the fastener during the initial portion of the penetration thereof into the lining material. As another example, an annular guide slit penetrating the lining material to a depth equal to or less than axial penetration of the self-tapping screw flight could be provided. Such a slit would have a diameter corresponding to the diameter of the annular knife edge on the penetrating end of the fastener and, preferably, would provide an annular cut line which for all practical purposes would have no radial dimension which would materially affect the clamping relationship of the annular fastener wall by the portions of lining material within the bore and surrounding the outer surface of the fastener shank.

While the embodiments illustrated in FIGS. 1–3 show liner segments attached to a support member by self-threading fastener members embedded in the material of the liner segments, it will be appreciated that many liner structures exist in which all of the lining components are not directly fastened to the support member in this manner. For example, mill drum linings often include a number of lining segments disposed side-by-side and having adjacent side edges clamped to the drum wall by a wear bar which is fastened to the wall. Such a lining structure is illustrated in FIG. 4 of the drawing, wherein it will be seen that the inner surface of a mill drum wall 80 is covered by a plurality of lining segments 82 disposed in side-by-side relationship. The circumferentially adjacent side edges of segments 82 are clamped to wall 80 by means of a wear bar 84 of wear resistant resilient lining material. In the embodiment illustrated, the adjacent side edges of the lining components 82 are defined by steel plates 86 vulcanized to the corresponding lining segment and extending circumferentially beyond the corresponding side face of the lining component. Wear bar 84 is adapted to be received in the circumferential space between the side faces of adjacent lining components and, in the embodiment illustrated, is provided along the lower corners thereof with longitudinally extending L-shaped steel reinforcing elements 88. The bottom legs of reinforcing elements 88 are circumferentially spaced apart to receive the shank of a threaded fastener 90 which structurally corresponds to the fastener illustrated in FIG. 3 and described hereinabove. Accordingly, fastener 90 is a self-threading fastener adapted to be introduced through an opening 92 provided therefor in drum wall 80 and thence into self-tapping embedment in the material of wear bar 84. As the fastener is screwed into the wear bar, the head of the fastener engages the outer surface of drum wall 80 and draws the wear bar radially outwardly to clamp steel plates 86 and thus the adjacent liner components 82 in place with respect to the drum wall.

While the embodiment of FIG. 4 illustrates a specific lining component and wear bar structure, it will be appreciated that many embodiments of lining components and wear bars are employed to achieve clamping of the lining components to the drum wall. For example, steel plates 86 can be eliminated and the shoulder defined thereby for engagement with the bottom of the wear bar can be defined by portions of the material of the lining segments projecting circumferentially with respect to the opposed side faces of the lining components. With such a structure, the bottom edge of the wear bar engages the projecting flanges of the material to achieve a clamping relationship upon threading of the fastener into the wear bar. Further, steel plates 86 can be employed in conjunction with such a shoulder of lining material to reinforce the clamping shoulder extending along the side edge of the lining component. Many modifications of the interengaging relationship between adjacent lining components and a wear bar for clamping the components to a drum wall can be provided, and it will be appreciated that it is only necessary in accordance with the present invention to provide for screwing the self-threading fastener into the material of the wear bar to achieve clamping of the liner components to the mill drum wall. It will be further appreciated that the wear bar need not project radially inwardly from the inner surfaces of the lining components as illustrated. Moreover, it will be understood that the wear bar or clamping member is a component part of the lining assembly, and, accordingly, the terms liner, lining and lining means appearing herein and in the appended claims are intended to be inclusive of any lining arrangement in which the lining components are adapted to be directly and/or indirectly secured to a support member by a self-threading fastener or fasteners embedded in a component of the lining assembly.

While considerable emphasis has been placed herein on the specific structure of the fastener components described, it will be appreciated that other fastener structures having self-tapping capability can be employed without departing from the principles of the present invention. Moreover, it will be appreciated that the fastener and support member for the lining material can be interengaged other than by a threaded nut assembled on the fastener shank or a bolt head integral with the shank. Many possible embodiments of the present invention may be made and many possible changes may be made in the embodiments herein illustrated and described and, accordingly, it is to be distinctly understood that the foregoing descriptive matter is to be interpreted merely as illustrative of the present invention and not as a limitation.

What is claimed is:

1. A lining and fastener arrangement for a device having a surface subject to wear comprising, lining means of wear resistant resilient material covering said surface, and self-tapping fastener means attaching said lining means to said device, said fastener means including hollow externally threaded shank means rotatably embedded in the material of said lining means, said shank means having an end in said lining means, said fastener means including means denoting the depth of embedment of said shank means in said lining means, said lining means having a thickness in the direction of the axis of said fastener means, and said denoting means being spaced from said end of said shank means a distance less than said thickness.

2. The lining and fastener arrangement according to claim 1, wherein said fastener means includes solid shank means integral with said hollow shank means and externally threaded to receive nut means.

3. The lining and fastener arrangement according to claim 1, wherein said denoting means is radially outwardly projecting flange means on said shank means.

4. A lining and fastener arrangement for a device including a wall member having a surface subject to wear comprising, lining means of resilient material having a first surface spaced from said surface of said member and a second surface parallel to said first surface and facing said member surface, and fastener means for attaching said liner means to said wall member, said fastener means including shank means having opposite ends and a bore extending from one of said ends toward the other and providing an annular wall of uniform diameter having inner and outer surfaces, thread means on said outer surface of said annular wall, said thread means including thread convolutions of uniform depth having corresponding root lines, said root lines of adjacent convolutions being axially spaced apart along said outer surface, said one end of said shank means being embedded in said lining means in the direction from said second surface toward said first surface with a portion of the material of said lining means laterally filling said bore, said thread means radially penetrating the portion of said lining material surrounding said annular wall and said outer surface of said annular wall radially expanding the latter of said portions of said lining material, whereby said annular wall is resiliently clamped radially between said material portions, and means including tool pad means on said shank means for rotating said fastener means and interconnecting said fastener means with said wall member.

5. The lining and fastener arrangement according to claim 4, wherein said means on said shank means is a polygonal head on the other end of said shank means integral with said shank means.

6. The lining and fastener arrangement according to claim 4, wherein said corresponding root lines of each said convolutions are axially spaced apart a distance less than the axial space between said root lines of adjacent convolutions.

7. The lining and fastener arrangement according to claim 4, wherein said means on said shank means further includes external thread means on the other end of said shank means for receiving internally threaded nut means.

8. The lining and fastener arrangement according to claim 7, wherein said one end of said shank means is embedded in said lining means a distance less than the distance between said first and second surfaces, said tool pad means being spaced from said one end a distance corresponding generally to said distance of embedment.

9. A lining and fastener arrangement for a device including a wall member having a surface subject to wear comprising, lining means of resilient material having a first surface spaced from said surface of said member and a second surface parallel to said first surface and facing said member surface, and fastener means attaching said liner means to said wall member, said fastener means including shank means having opposite ends and a bore extending from one of said ends toward the other and providing an annular wall having inner and outer surfaces, thread means on said outer surface of said annular wall, said one end of said shank means being embedded in said lining means in the direction from said second surface toward said first surface with a portion of the material of said lining means laterally filling said bore, said thread means radially penetrating the portion of said lining material surrounding said annular wall and said outer surface of said annular wall radially expanding the latter of said portions of said lining material, whereby said annular wall is resiliently clamped radially between said material portions, and means on the other end of said shank means for interconnecting said fastener means with said wall member, said one end of said shank means being embedded in said lining means a distance less than the distance between said first and second surfaces, and said fastener means including means on said shank means spaced from said one end a distance corresponding generally to said distance of embedment.

10. The lining and fastener arrangement according to claim 9, wherein said means on the other end of said shank means is external thread means for receiving nut means.

11. The lining and fastener arrangement according to claim 9, wherein said means on said shank means spaced from said one end is radially outwardly projecting flange means on said shank means.

* * * * *